United States Patent
Maji et al.

(10) Patent No.: US 12,462,690 B2
(45) Date of Patent: Nov. 4, 2025

(54) SYSTEM AND METHOD TO DISPLAY DIFFERENTIAL GROUND SPEED ON A COCKPIT DISPLAY

(71) Applicant: HONEYWELL INTERNATIONAL INC., Charlotte, NC (US)

(72) Inventors: Sanjib Maji, Bangalore (IN); Kaushik Viswanatha, Bangalore (IN); Mohammed Ibrahim Mohideen, Bangalore (IN); Sadguni Venkataswamy, Bangalore (IN)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 308 days.

(21) Appl. No.: 18/295,083

(22) Filed: Apr. 3, 2023

(65) Prior Publication Data
US 2024/0282200 A1    Aug. 22, 2024

(51) Int. Cl.
G08G 5/00      (2025.01)
B64D 43/02     (2006.01)
G08G 5/21      (2025.01)
G08G 5/50      (2025.01)
G08G 5/55      (2025.01)

(52) U.S. Cl.
CPC ............... *G08G 5/21* (2025.01); *B64D 43/02* (2013.01); *G08G 5/50* (2025.01); *G08G 5/55* (2025.01)

(58) Field of Classification Search
CPC .......... G05G 5/0047; G05G 5/21; G05G 5/23; G05G 5/50; G05G 5/55; B64D 43/02

USPC ........................................................ 701/120
See application file for complete search history.

(56) References Cited

U.S. PATENT DOCUMENTS

| | | | |
|---|---|---|---|
| 9,646,504 B2 | 5/2017 | Shafaat et al. | |
| 10,461,615 B2 * | 10/2019 | Posselt | H02K 17/02 |
| 10,713,960 B1 | 7/2020 | Ziarnick et al. | |
| 11,257,387 B2 * | 2/2022 | Karas | G08G 5/21 |
| 11,348,469 B2 | 5/2022 | Manberg et al. | |
| 11,417,227 B2 * | 8/2022 | Mecklem | G08G 5/25 |
| 11,495,134 B2 * | 11/2022 | Liu | G01S 15/93 |

(Continued)

FOREIGN PATENT DOCUMENTS

| | | |
|---|---|---|
| CN | 112185172 A | 1/2021 |
| EP | 3573038 A | 11/2019 |
| EP | 3796287 A1 | 3/2021 |

*Primary Examiner* — Andrew Joseph Rudy
(74) *Attorney, Agent, or Firm* — Lorenz & Kopf LLP (57) ABSTRACT

Systems and methods are provided for displaying differential ground speed for traffic surrounding an aircraft. The system includes an aircraft control panel in a cockpit of an ownship aircraft and a digital traffic display located on the control panel. The digital traffic display provides cockpit display of traffic information (CDTI) that shows a speed scale with a graphical display of the ground speed of the ownship aircraft and the ground speed of traffic to follow (TTF). The separation scale also shows a graphical display of a separation distance between the ownship aircraft and the TTF. A change in separation distance is calculated based of the difference in ground speed between the ownship aircraft and the TTF. An advisory/warning indicator that shows a color-coded status of the change in separation distance in comparison a pre-determined desired separation distance between the ownship aircraft and the TTF.

20 Claims, 7 Drawing Sheets

(56) References Cited

U.S. PATENT DOCUMENTS

| | | | | |
|---|---|---|---|---|
| 11,790,794 B2* | 10/2023 | Gibbons, II | ............ | G01W 1/02 701/120 |
| 2016/0049080 A1* | 2/2016 | Bazawada | ................ | G08G 5/26 701/120 |

* cited by examiner

Figure 4: Faster TTF and Differential Ground Speed keeps the Separation within the Defined Limit

SYSTEM AND METHOD TO DISPLAY DIFFERENTIAL GROUND SPEED ON A COCKPIT DISPLAY

CROSS-REFERENCE TO RELATED APPLICATION

This application claims priority to India Provisional Patent Application No. 202311010790, filed Feb. 17, 2023, the entire content of which is incorporated by reference herein.

TECHNICAL FIELD

The present invention generally relates to aircraft operations, and more particularly relates to a system and method to display differential ground speed on a cockpit display.

BACKGROUND

Presently, Cockpit Display of Traffic Information (CDTI) provides digital indication of ground speed of an aircraft. CDTI Assisted Visual Separation (CAVS) allows use of a traffic display of alphanumerical data to maintain separation from the Traffic to Follow (TTF) during a visual separation approach. However, interpreting alphanumerical information is generally slower and more cognitively demanding than interpreting graphical information. Hence, there is a need for a system and method to display differential ground speed graphically on a cockpit display.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for displaying differential ground speed for traffic surrounding an aircraft. The system comprises: an aircraft control panel in a cockpit of an ownship aircraft; and a digital traffic display for providing cockpit display of traffic information (CDTI), where the digital traffic display is located on the control panel and shows, a speed scale that shows a graphical display of ground speed of the ownship aircraft and ground speed of traffic to follow (TTF), a separation scale that shows a graphical display of a separation distance between the ownship aircraft and the TTF, where a change in the separation distance is calculated based of the ground speed difference between the ownship aircraft and the TTF over a pre-determined time period, and an advisory/warning indicator that shows a color-coded status of a predicted change in separation distance in comparison a pre-determined desired separation distance between the ownship aircraft and the TTF.

A method is provided for displaying differential ground speed for traffic surrounding an aircraft. The method comprises: showing a speed scale that depicts a graphical display of ground speed of an ownship aircraft and ground speed of traffic to follow (TTF) on a digital traffic display for providing cockpit display of traffic information (CDTI) of the ownship aircraft; showing a separation scale that shows a graphical display of a separation distance between the ownship aircraft and the TTF, where a change in the separation distance is calculated based of the ground speed difference between the ownship aircraft and the TTF over a pre-determined time period; and showing an advisory/warning indicator of a color-coded status of a predicted change in separation distance in comparison a pre-determined desired separation distance between the ownship aircraft and the TTF.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may be separate from, or integrated within, a preexisting mobile platform management system, avionics system, or aircraft flight management system (FMS).

Systems and methods have been developed for displaying differential ground speed for traffic surrounding an aircraft. The system includes an aircraft control panel in a cockpit of an ownship aircraft and a digital traffic display located on the control panel. The digital traffic display provides cockpit display of traffic information (CDTI) that shows a speed scale with a graphical display of the ground speed of the ownship aircraft and the ground speed of traffic to follow (TTF). The separation scale also shows a graphical display of a separation distance between the user's aircraft ("ownship") and the TTF. A change in separation distance is calculated based of the difference in ground speed between the ownship and the TTF. An advisory/warning indicator that shows a color-coded status of the change in separation distance in comparison a pre-determined desired separation distance between the ownship aircraft and the TTF.

CDTI Assisted Visual Separation (CAVS) provide a Traffic Display to be used in order maintain separation from the TTF during a visual separation approach. According to the operational requirement of CAVS, following parameters need to be monitored while maintaining separation from the TTF: ground speed of the ownship; ground speed of the TTF; horizontal range from the TTF; and the differential in ground speeds.

The differential ground speed provides an indication about the trend of the separation. When the ownship is faster than the TTF, the separation decreases over time. Conversely, when the ownship is slower than the TTF, the separation increases over time. Flight crews need to compare the TTF ground speed and the ownship ground speed to get a sense of the separation trends. If the advisory separation distance that was set by the pilot will be violated, an advisory is need for the pilot to take corrective action to maintain the required separation. There is an advantage to depict the differential ground speed in an intuitive manner so that it provides an indication on the change in separation. This will enable the pilot to maintain the desired separation more efficiently by taking proactive action based on the graphical representation provided on the display.

Figure 1:
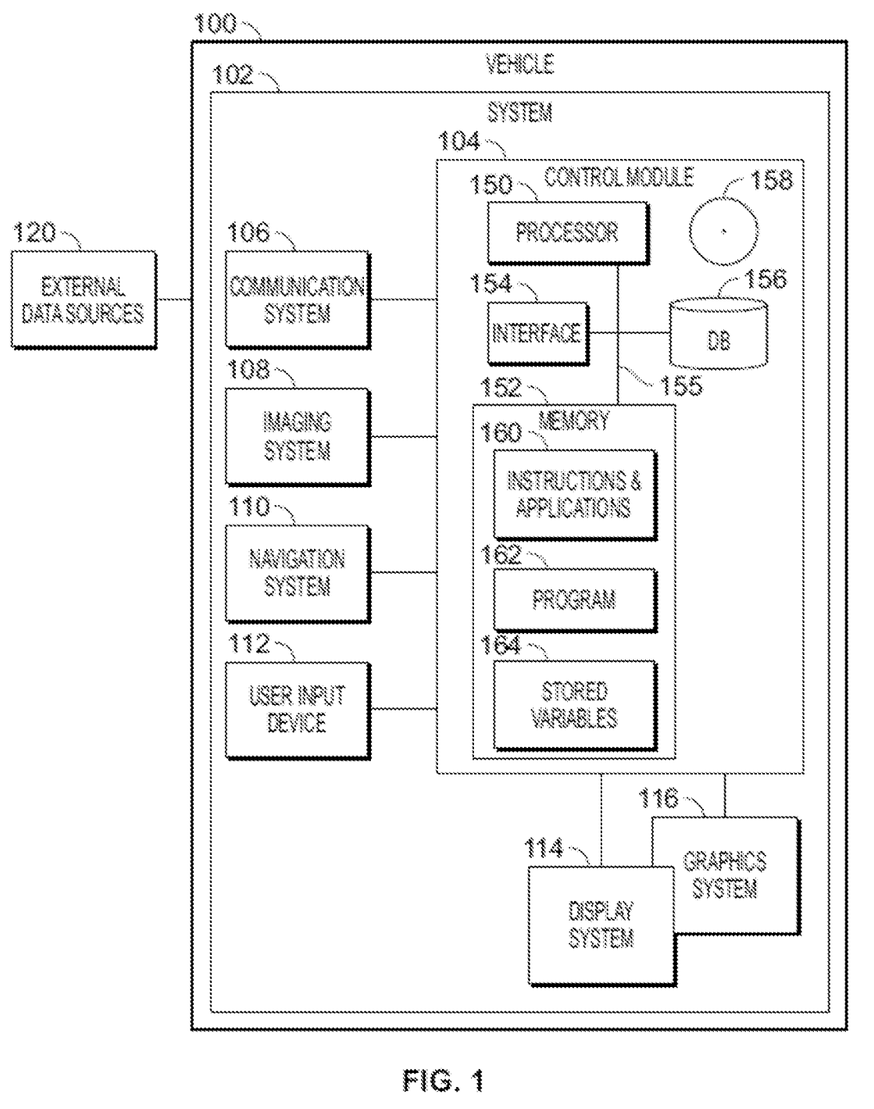
FIG. 1 shows a vehicle system that includes a display system and a graphics system in accordance with one embodiment.
Figure 2:
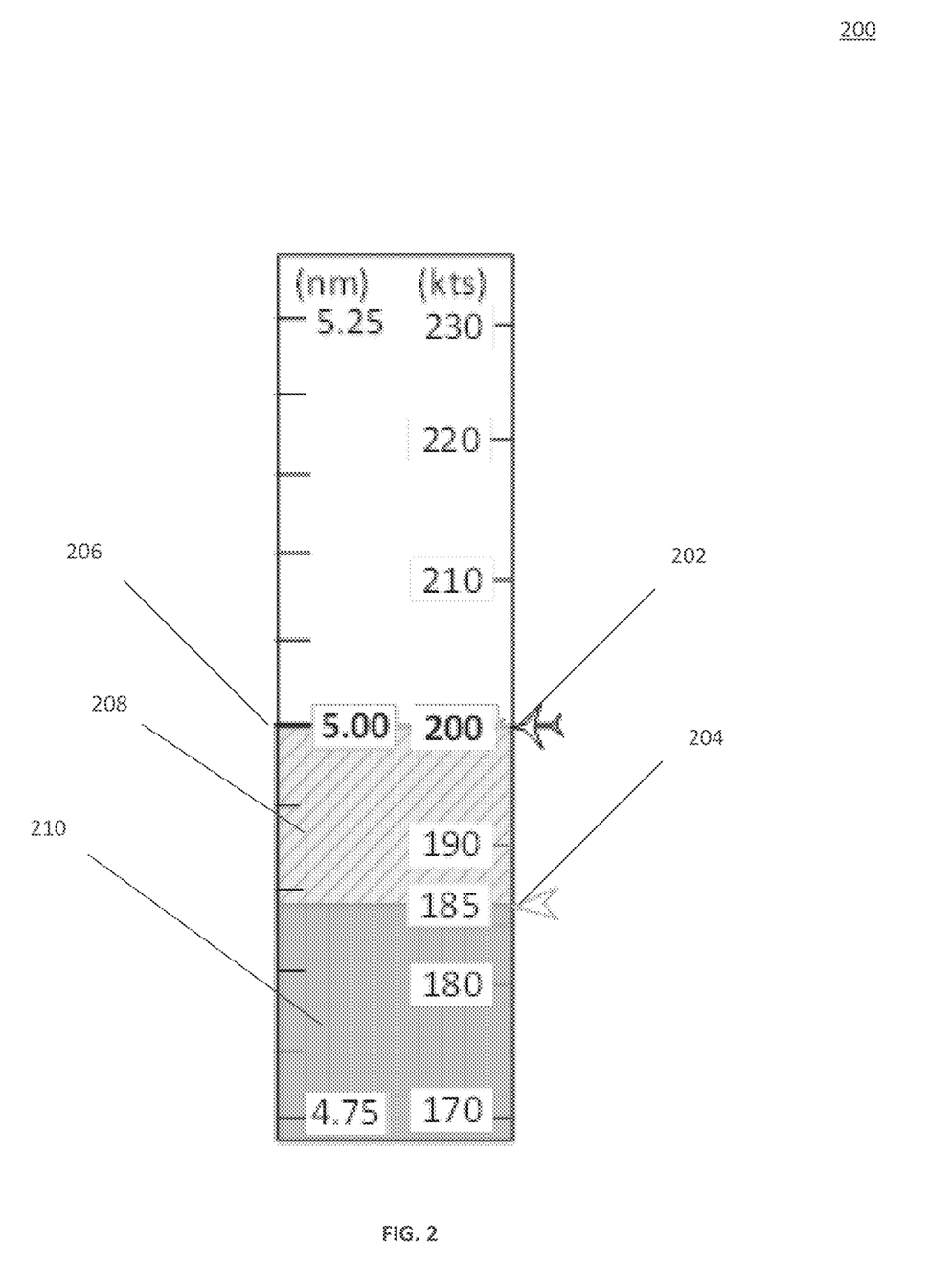
FIG. 2 shows a graphical display of ground speed of ownship and ground speed of traffic to follow (TTF) with the separation within a defined limit in accordance with one embodiment.

Turning now to FIG. 1, in the depicted embodiment, the vehicle system 102 includes: the control module 104 that is operationally coupled to a communication system 106, an imaging system 108, a navigation system 110, a user input device 112, a display system 114, and a graphics system 116. The operation of these functional blocks is described in more detail below. In the described embodiments, the depicted vehicle system 102 is generally realized as an aircraft flight deck display system within a vehicle 100 that is an aircraft; however, the concepts presented here can be deployed in a variety of mobile platforms, such as land vehicles, spacecraft, watercraft, and the like. Accordingly, in various embodiments, the vehicle system 102 may be associated with or form part of larger aircraft management system, such as a flight management system (FMS).

In the illustrated embodiment, the control module 104 is coupled to the communications system 106, which is configured to support communications between external data source(s) 120 and the aircraft. External source(s) 120 may comprise air traffic control (ATC), or other suitable command centers and ground locations. Data received from the external source(s) 120 includes the instantaneous, or current, visibility report associated with a target landing location or identified runway. In this regard, the communications system 106 may be realized using a radio communication system or another suitable data link system.

The imaging system 108 is configured to use sensing devices to generate video or still images and provide image data therefrom. The imaging system 108 may comprise one or more sensing devices, such as cameras, each with an associated sensing method. Accordingly, the video or still images generated by the imaging system 108 may be referred to herein as generated images, sensor images, or sensed images, and the image data may be referred to as sensed data.

In other embodiments, the imaging system 108 may be a surveillance system which provides information about the surrounding aircraft. Examples include a traffic collision avoidance system (TCAS), an automatic dependent surveillance-broadcast (ADS-B), a traffic information service-broadcast (TIS-B), etc. In another embodiment, the imaging system 108 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 108 comprises a radar based video camera system. Radar based systems emit pulses of electromagnetic radiation and listen for, or sense, associated return echoes. The radar system may generate an image or video based upon the sensed echoes. In another embodiment, the imaging system 108 may comprise a sonar system. The imaging system 108 uses methods other than visible light to generate images, and the sensing devices within the imaging system 108 are much more sensitive than a human eye. Consequently, the generated images may comprise objects, such as mountains, buildings, or ground objects, that a pilot might not otherwise see due to low visibility conditions.

In various embodiments, the imaging system 108 may be mounted in or near the nose of the aircraft (vehicle 100) and calibrated to align an imaging region with a viewing region of a primary flight display (PFD) or a Head Up display (HUD) rendered on the display system 114. For example, the imaging system 108 may be configured so that a geometric center of its field of view (FOV) is aligned with or otherwise corresponds to the geometric center of the viewing region on the display system 114. In this regard, the imaging system 108 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 114 are three dimensional, and the imaging system 108 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 110, or other aircraft and/or flight management systems.

Navigation system 110 is configured to provide real-time navigational data and/or information regarding operation of the aircraft. The navigation system 110 may be realized as a global positioning system (GPS), inertial reference system (IRS), or a radio-based navigation system (e.g., VHF omnidirectional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the current or instantaneous position and location information of the aircraft (e.g., the current latitude and longitude) and the current altitude or above ground level for the aircraft. Additionally, in an exemplary embodiment, the navigation system 110 includes inertial reference sensors capable of obtaining or otherwise determining the attitude or orientation (e.g., the pitch, roll, and yaw, heading) of the aircraft relative to earth.

The user input device 112 is coupled to the control module 104, and the user input device 112 and the control module 104 are cooperatively configured to allow a user (e.g., a pilot, co-pilot, or crew member) to interact with the display system 114 and/or other elements of the vehicle system 102 in a conventional manner. The user input device 112 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 112 may be integrated with a display device. Non-limiting examples of uses for the user input device 112 include: entering values for stored variables 164, loading or updating instructions and applications 160, and loading and updating the contents of the database 156, each described in more detail below.

The generated images from the imaging system 108 are provided to the control module 104 in the form of image data. The control module 104 is configured to receive the image data and convert and render the image data into display commands that command and control the renderings of the display system 114. This conversion and rendering may be performed, at least in part, by the graphics system 116. In some embodiments, the graphics system 116 may be integrated within the control module 104; in other embodiments, the graphics system 116 may be integrated within the display system 114. Regardless of the state of integration of these subsystems, responsive to receiving display commands from the control module 104, the display system 114 displays, renders, or otherwise conveys one or more graphical representations or displayed images based on the image data (i.e., sensor based images) and associated with operation of the vehicle 100, as described in greater detail below. In various embodiments, images displayed on the display system 114 may also be responsive to processed user input that was received via a user input device 112.

In general, the display system 114 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 114 may be part of, or include, a primary flight display (PFD) system, a panel-mounted head down display (HDD), a head up display (HUD), a head mounted display system, such as a "near to eye display" system, a multi-function display (MFD) or any suitable handheld device such as an electronic flight bag (EFB), a tablet or smartphone. The display system 114 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 104 performs the functions of the vehicle system 102. With continued reference to FIG. 1, within the control module 104, the processor 150 and the memory 152 (having therein the program 162) form a novel processing engine that performs the described processing activities in accordance with the program 162, as is described in more detail below. The control module 104 generates display signals that command and control the display system 114.

The control module 104 includes an interface 154, communicatively coupled to the processor 150 and memory 152 (via a bus 155), database 156, and an optional storage disk 158. In various embodiments, the control module 104 performs actions and other functions in accordance with other embodiments. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the database 156, or a disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 156 may be organized and/or imported from an external source 120 during an initialization step of a process.

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 120 directly. The interface 154 may also include one or more network interfaces to communicate with technicians, and/or one or more storage interfaces to connect to storage apparatuses, such as the database 156.

It will be appreciated that the vehicle system 102 may differ from the embodiment depicted in FIG. 1. As mentioned, the vehicle system 102 can be integrated with an existing flight management system (FMS) or aircraft flight deck display.

During operation, the processor 150 loads and executes one or more programs, algorithms and rules embodied as instructions and applications 160 contained within the memory 152 and, as such, controls the general operation of the control module 104 as well as the vehicle system 102. In executing the process described herein, the processor 150 specifically loads and executes the novel program 162. Additionally, the processor 150 is configured to process received inputs (any combination of input from the communication system 106, the imaging system 108, the navigation system 110, and user input provided via user input device 112), reference the database 156 in accordance with the program 162, and generate display commands that command and control the display system 114 based thereon.

While maintaining separation from the TTF, a pilot needs to monitor separation as well as the differential ground speed. For example, the current separation might be high but if the differential ground speed is also high, the separation will reduce very quickly and the pilot needs to take corrective action. On the converse, if the separation is near the desired distance and the differential ground speed is low or nil, then the current separation will be maintained for a longer time and the pilot may not be requires to take any corrective action.

Embodiments of the system method helps the pilot visualize the speed difference and its impact on the separation. The pilot may then take corrective action without excessive cognitive effort. It may also provide an indication of the applicable limit of the ground speed based on the phase of the flight so that pilot does not change speed beyond the allowable range to maintain the separation. Embodiments of the display system will enhance pilot's ability to quickly identify the differential ground speed while following an aircraft. The graphical representation of the change in separation will help the pilot to decide if any immediate speed correction is required. It's representation of differential ground speed and its impact on separation will reduce the head down time which is important as the pilot also needs to observe/search TTF out the window (OTW).

The proposed system provides graphical representation of the differential ground speed and its impact on the change in separation distance/time after a predefined time. Embodiments display a graphical scale on the cockpit display when the aircraft is following a traffic. In some embodiments, the right side of the scale provides the ground speed information of the ownship aircraft and the TTF. The ownship aircraft's ground speed is represented at the center of the tape, with the TTF aircraft's ground speed indication placed below or above the ownship aircraft's ground speed indication, based on whether the TTF aircraft is slower or faster than the ownship aircraft. This graphic representation gives the pilot an intuitive visual cue about the differential ground speed, without referring the digital readout.

In some embodiments, the left side of the scale provides the separation distance information. The middle marker on the scale represents the current separation between the ownship and the TTF. The range of the separation scale is decided based on the separation that will be reduced/increased in a predefined time (e.g., 30 sec) with the maximum differential ground speed depicted on the right side of the scale (e.g., 30 knots).

If there is a difference in the ground speed between the ownship and the TTF, the system calculates the change in separation after the pre-defined time based on the differential ground speed. The change in separation distance may be represented by a cross-hatched area on the scale. If the current differential ground speed maintains the separation above the pilot defined desired separation distance after the predefined time, then the differential ground speed depiction scale may be colored in non-advisory/non-warning color (e.g., green or white). If the current differential ground speed reduces the separation below the pilot defined desired separation distance after the predefined time, then the differential ground speed depiction scale may be colored in an advisory color (e.g., cyan). If the current differential ground speed reduces the separation below the minimum separation distance defined for the specific operation (e.g., for CAVS minimum separation distance is defined as 1.4 nm), then the differential ground speed depiction scale is colored in a warning color (e.g., amber).

In summary, the graphical representation provides a correlation between the current differential ground speed and the change in separation after a predefined time. This enables the pilot to proactively take corrective action, like adjusting speed or track, to bring the predicted separation within the pilot defined separation distance. The system depicts the permissible speed range for specific phase of the flight so that while changing the speed to maintain the separation pilot does not reduce/increase the speed beyond the permissible speed range.

FIGS. 2-6 illustrate depictions of differential ground speed and impact to the separation in some embodiments. In these examples, the pilot has defined the desired separation as 4 nautical miles (NM) from the TTF while performing a CDTI Assisted Visual Separation Approach (CAVS). Turing now to FIG. 2, a graphical display 200 is shown of the ground speed of ownship 202 and the ground speed of TTF 204 with the separation within a defined limit in accordance with one embodiment. As shown, the ground speed of the ownship 202 is 200 Knots and ground speed of the TTF 204 is 185 Knots. Current separation is 5 NM 206. As the TTF is flying slower than the ownship, it is represented below the ownship on the scale. Based on the differential ground speed, the predicted separation after 30 seconds 208 will reduce by 0.125 NM, which is indicated by the cross-hatched area in the tape. The final separation after 30 seconds will be 4.875 NM, which is above the defined desired separation. As the current differential ground speed will not cause any separation violation after a predefined time, the depiction of the differential ground speed on the scale is colored in a non-advisory/non-warning color 210 (e.g., green in the figure).

Figure 3:
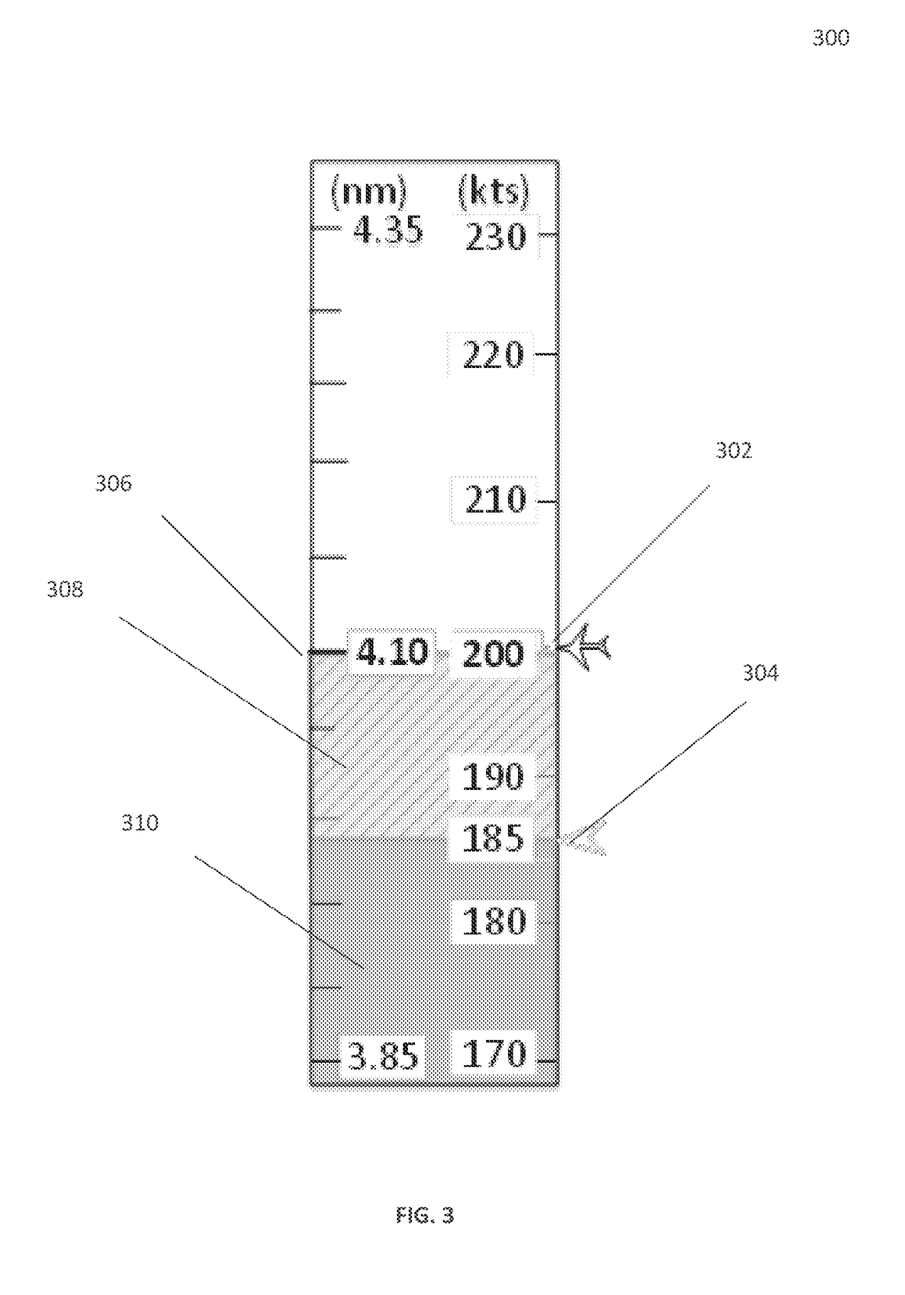
FIG. 3 shows a graphical display of ground speed of ownship and ground speed of TTF with the separation below the defined limit in accordance with one embodiment.

Turning now to FIG. 3, a graphical display 300 is shown of ground speed of the ownship 302 and the ground speed of TTF 304 with the separation below the defined limit in accordance with one embodiment. With the passage of time, due to the ownship speed 302 being greater than the TTF speed 304, the distance of separation is bound to decrease. As shown, the current separation 306 has reached 4.10 NM. The predicted separation distance after 30 seconds 308 will be 3.975 NM, which is below the desired separation distance defined by the pilot. As the current differential ground speed will cause the separation to be reduced below the desired separation after a predefined time, the depiction of the differential ground speed on the scale is colored in an advisory color 310 (e.g., cyan in the figure). This indication provides pilot sufficient time to decrease his ground speed to maintain the defined separation.

Figure 4:
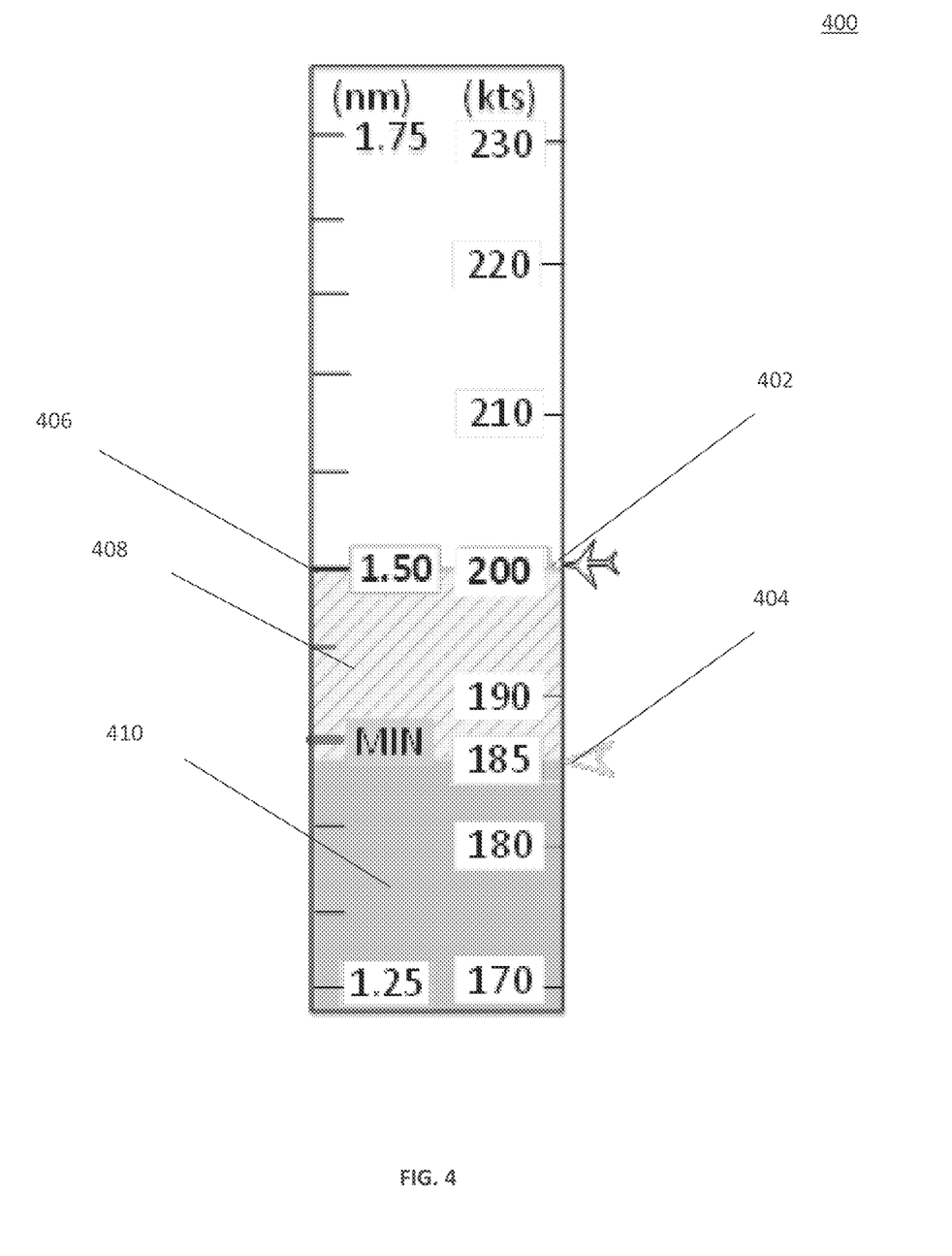
FIG. 4 shows a graphical display of ground speed of ownship and ground speed of TTF with the separation below the minimum separation in accordance with one embodiment.

Turning now to FIG. 4, a graphical display 400 is shown of ground speed of the ownship 402 and ground speed of the TTF 404 with the separation below the minimum separation in accordance with one embodiment. If the pilot continues to fly with same speed, the separation distance will further reduce. As shown, the current separation 406 has reached to 1.5 NM. The predicted separation distance after 30 seconds 408 will be 1.375 NM, which is below the minimum separation that must be maintained in CAVS operation. As the current differential ground speed will cause the separation to be reduced below the minimum separation after a predefined time, the depiction of the differential ground speed on the scale is colored in warning color 410 (e.g., amber in the figure).

Figure 5:
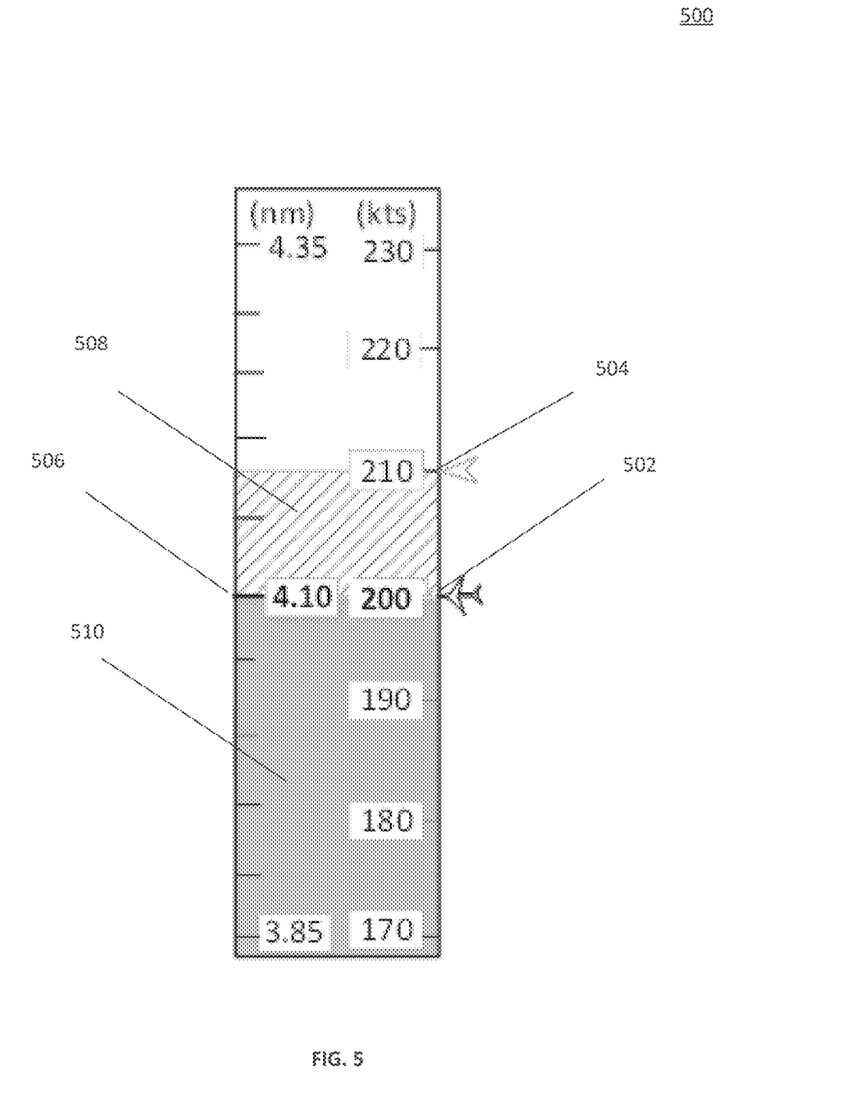
FIG. 5 shows a graphical display of ground speed of ownship and a faster ground speed of traffic to follow (TTF) with the separation within a defined limit in accordance with one embodiment.

Turning now to FIG. 5, a graphical display 500 is shown of ground speed of the ownship 502 and a faster ground speed of the TTF 504 with the separation within a defined limit in accordance with one embodiment. In another example, if the TTF aircraft is flying faster than the ownship aircraft, then TTF is represented above the ownship on the scale and the separation distance will increase with the time. As shown, as the separation distance 506 will remain above the defined separation distance, the depiction of the differential ground speed 510 on the scale is colored in green.

Figure 6:
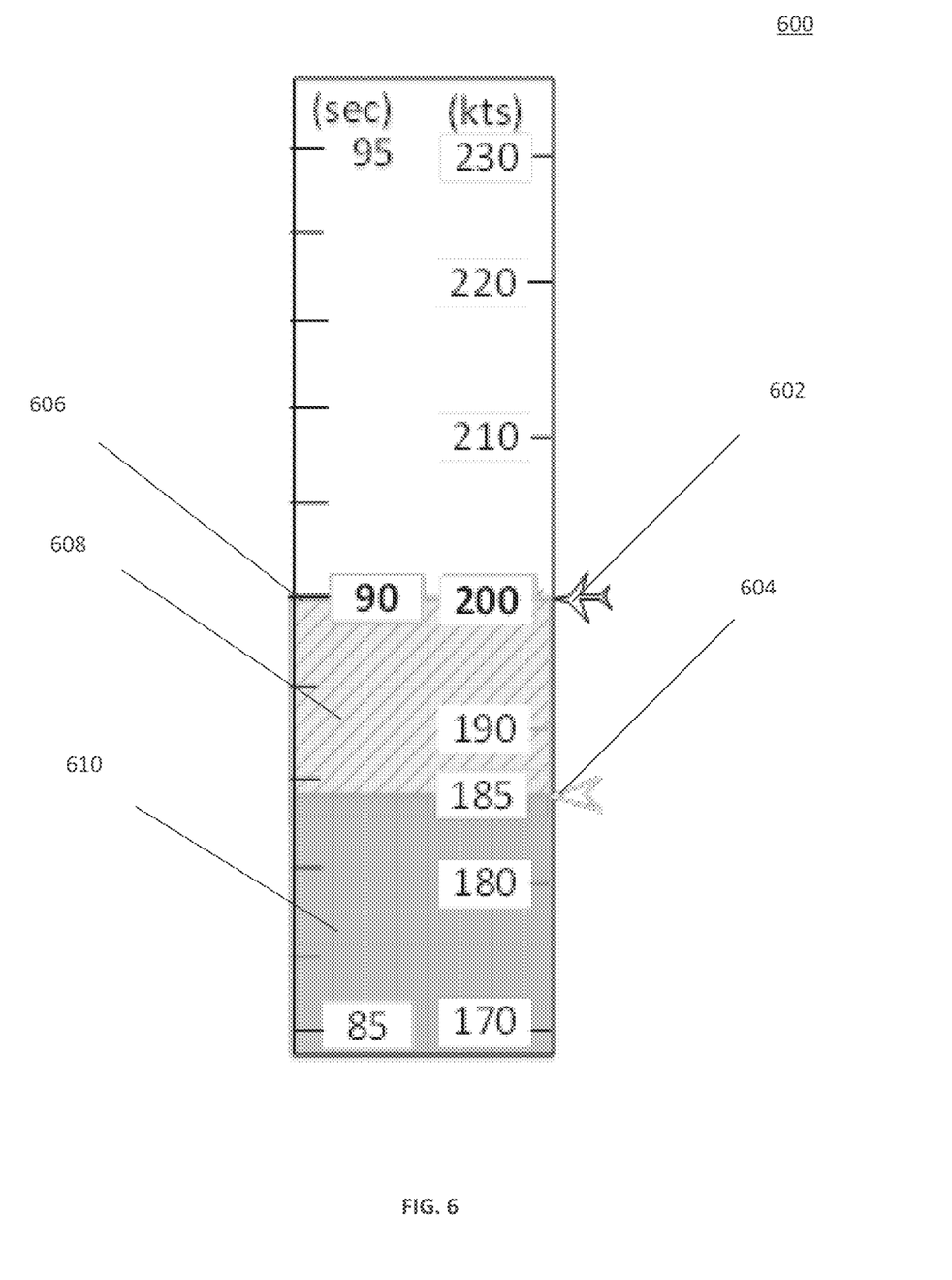
FIG. 6 shows a graphical display of ground speed of ownship and a slower ground speed of traffic to follow (TTF) within the separation within a defined time limit in accordance with one embodiment.

Turning now to FIG. 6, a graphical display 600 is shown of ground speed of the ownship 602 and a slower ground speed of the TTF 604 with the separation within a defined time limit 606 in accordance with one embodiment. If both the TTF and the ownship aircraft are moving at or near the same speed, then there will be no change in the separation distance 608 in the course of time. So, there may be no cross-hatched area displayed on the scale in some embodiments. As the current differential ground speed will not cause any separation violation after a predefined time, the depiction of the differential ground speed on the scale is colored in a non-advisory/non-warning color 610 (e.g., green in the figure). In this example, the scale provides another representation of the scale where the current separation 606 and change in separation 608 are depicted in terms of time in sec instead of distance in NM.

Figure 7:
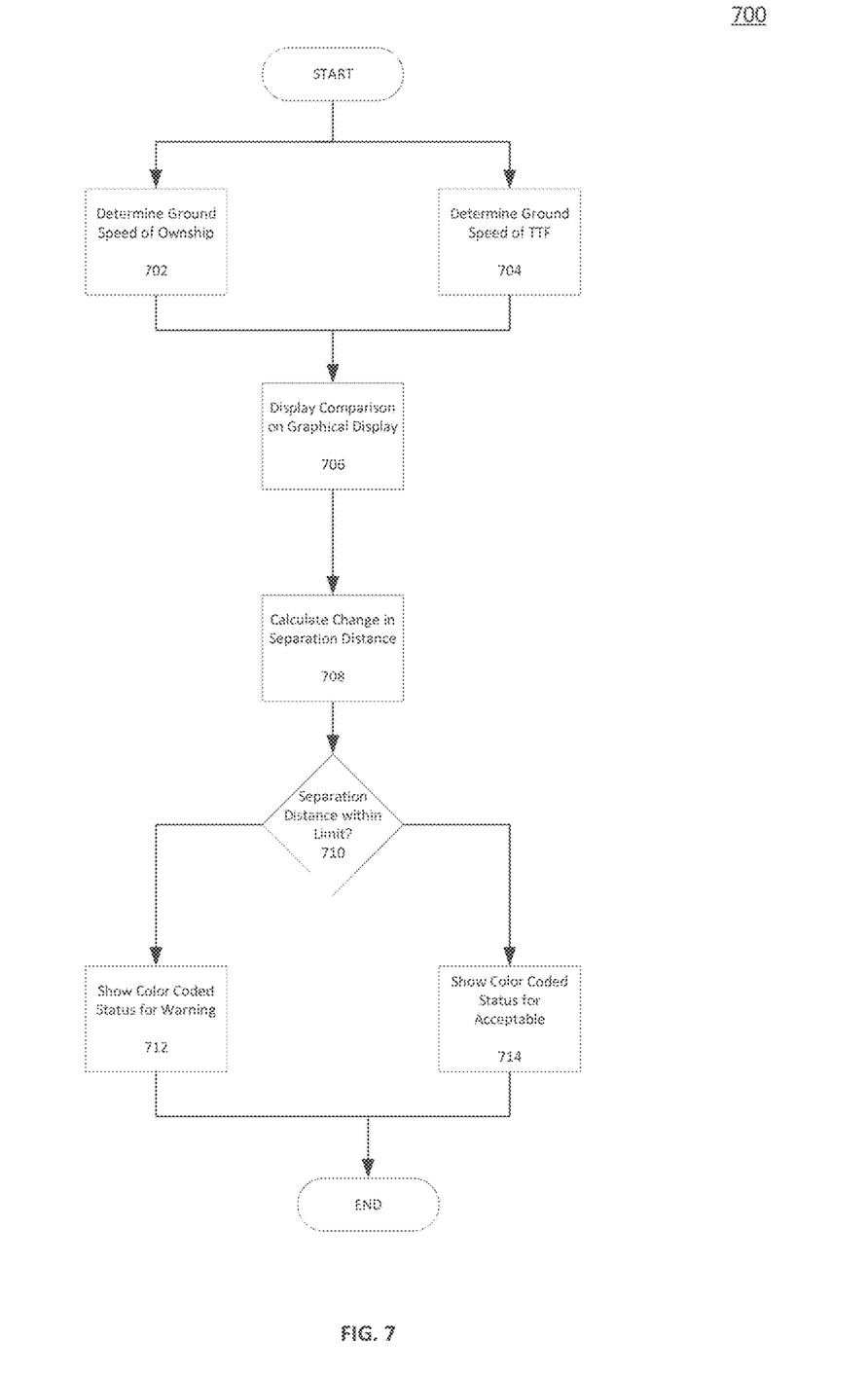
FIG. 7 shows a flowchart for a method for displaying differential ground speed for traffic surrounding an aircraft in accordance with one embodiment.

Turning now to FIG. 7, a flowchart 700 is shown for a method for displaying differential ground speed for traffic surrounding an aircraft in accordance with one embodiment. First, the ground speed of the ownship 702 and the ground speed of the TTF 704 is determined. A speed scale is shown 706 that depicts a graphical display of ground speed of an ownship aircraft and ground speed of traffic to follow (TTF) on a digital traffic display for providing cockpit display of traffic information (CDTI) of the ownship aircraft. A separation scale is shown that depicts a graphical display of a separation distance between the ownship aircraft and the TTF. Any change in the separation distance is calculated 708 based on the difference in ground speed between the ownship aircraft and the TTF. The separation distance with reference to time is determined whether or not to be within a predetermined limit 710. An advisory/warning indicator of a color-coded status is shown of the change in separation distance in comparison a pre-determined desired separation distance between the ownship aircraft and the TTF. The different colors shown indicate either a warning 712 of the separation distance being too close or an advisory 714 that the separation distance is acceptable.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

What is claimed is:

1. A system for displaying differential ground speed for traffic surrounding an aircraft, comprising:
   an aircraft control panel in a cockpit of an ownship aircraft; and
   a digital traffic display for providing cockpit display of traffic information (CDTI), where the digital traffic display is located on the control panel and shows,
      a speed scale that shows a graphical display of ground speed of the ownship aircraft and ground speed of traffic to follow (TTF),
      a separation scale that shows a graphical display of a separation distance between the ownship aircraft and the TTF, where the separation scale is graphically co-located with the speed scale and where a change in the separation distance is calculated based on the ground speed difference between the ownship aircraft and the TTF over a pre-determined time period, and
      an advisory/warning indicator that shows a color-coded status of a predicted change in separation distance in comparison a pre-determined desired separation distance between the ownship aircraft and the TTF.

2. The system of claim 1, where the ground speed of the TTF is faster than the ground speed of the ownship aircraft.

3. The system of claim 1, where the ground speed of the TTF is slower than the ground speed of the ownship aircraft.

4. The system of claim 1, where the advisory/warning indicator shows a color that indicates the separation distance between the ownship aircraft and the TTF is less than the pre-determined desired separation distance.

5. The system of claim 1, where the advisory indicator shows a color that indicates the separation distance between the ownship aircraft and the TTF is greater than the pre-determined desired separation distance.

6. The system of claim 1, where the warning indicator shows a color that indicates the separation distance between the ownship aircraft and the TTF is less than a minimum pre-determined desired separation distance.

7. The system of claim 1, where the change in separation distance is increasing.

8. The system of claim 1, where the change in separation distance is decreasing.

9. The system of claim 1, where the change in separation distance is stable.

10. The system of claim 1, where the change in separation distance is determined with reference to a specific time period.

11. The system of claim 1, where the digital traffic display is located on a handheld electronic device.

12. A method for displaying differential ground speed for traffic surrounding an aircraft, comprising:
    showing a speed scale that depicts a graphical display of ground speed of an ownship aircraft and ground speed of traffic to follow (TTF) on a digital traffic display for providing cockpit display of traffic information (CDTI) of the ownship aircraft;
    showing a separation scale that shows a graphical display of a separation distance between the ownship aircraft and the TTF, where the separation scale is graphically co-located with the speed scale and where a change in the separation distance is calculated based on the ground speed difference between the ownship aircraft and the TTF over a pre-determined time period; and
    showing an advisory/warning indicator of a color-coded status of a predicted change in separation distance in comparison a pre-determined desired separation distance between the ownship aircraft and the TTF.

13. The method of claim 12, where the ground speed of the TTF is faster than the ground speed of the ownship aircraft.

14. The method of claim 12, where the ground speed of the TTF is slower than the ground speed of the ownship aircraft.

15. The method of claim 12, where the advisory/warning indicator shows a color that indicates the separation distance between the ownship aircraft and the TTF is greater than the pre-determined desired separation distance.

16. The method of claim 12, where the advisory/warning indicator shows a color that indicates the separation distance between the ownship aircraft and the TTF is less than the pre-determined desired separation distance.

17. The method of claim 12, where the advisory/warning indicator shows a color that indicates the separation distance between the ownship aircraft and the TTF is less than a minimum pre-determined desired separation distance.

18. The method of claim 12, where the change in separation distance is increasing.

19. The method of claim 12, where the change in separation distance is decreasing.

20. The method of claim 12, where the change in separation distance is determined with reference to a specific time period.

* * * * *